United States Patent
Sun et al.

(10) Patent No.: US 10,318,408 B2
(45) Date of Patent: Jun. 11, 2019

(54) DATA PROCESSING METHOD, DATA PROCESSING DEVICE, TERMINAL AND SMART DEVICE

(71) Applicant: Beijing Xiaomi Mobile Software Co., Ltd., Beijing (CN)

(72) Inventors: Qimin Sun, Beijing (CN); Enxing Hou, Beijing (CN); Deguo Meng, Beijing (CN)

(73) Assignee: Beijing Xiaomi Mobile Software Co., Ltd, Beijing (CN)

( * ) Notice: Subject to any disclaimer, the term of this patent is extended or adjusted under 35 U.S.C. 154(b) by 129 days.

(21) Appl. No.: 15/463,464

(22) Filed: Mar. 20, 2017

(65) Prior Publication Data

US 2017/0270029 A1    Sep. 21, 2017

(30) Foreign Application Priority Data

Mar. 21, 2016    (CN) .......................... 2016 1 0162171

(51) Int. Cl.
| | |
|---|---|
| *G06F 11/00* | (2006.01) |
| *G06F 11/36* | (2006.01) |
| *H04L 12/26* | (2006.01) |
| *G06F 11/30* | (2006.01) |
| *G06F 11/32* | (2006.01) |

(Continued)

(52) U.S. Cl.
CPC ...... *G06F 11/3656* (2013.01); *G06F 11/3006* (2013.01); *G06F 11/3024* (2013.01); *G06F 11/3048* (2013.01); *G06F 11/321* (2013.01); *G06F 11/3636* (2013.01); *H04L 43/18* (2013.01); *H04L 69/22* (2013.01); *H04W 84/12* (2013.01)

(58) Field of Classification Search
CPC ............ G06F 11/3006; G06F 11/3024; G06F 11/3048; G06F 11/321; G06F 11/3636; G06F 11/3656
See application file for complete search history.

(56) References Cited

U.S. PATENT DOCUMENTS

| | | | |
|---|---|---|---|
| 5,875,292 | A | 2/1999 | Taketsugu |
| 6,067,407 | A | 5/2000 | Wadsworth et al. |
| (Continued) | | | |

FOREIGN PATENT DOCUMENTS

| | | |
|---|---|---|
| CN | 1885822 A | 12/2006 |
| CN | 105050115 A | 11/2015 |
| (Continued) | | |

OTHER PUBLICATIONS

Extended European Search Report issued in Application No. 17161846.5 dated Sep. 25, 2017.

(Continued)

*Primary Examiner* — Joshua P Lottich
(74) *Attorney, Agent, or Firm* — Finnegan, Henderson, Farabow, Garrett & Dunner LLP

(57) ABSTRACT

A method for processing data, includes: acquiring data packets having respective serial numbers and transmitted between a first microcontroller unit (MCU) and a second MCU of a smart device, the second MCU being provided in a Wireless Fidelity (Wi-Fi) module of the smart device; and processing and displaying the acquired data packets based on the respective serial numbers so as to debug the second MCU.

16 Claims, 11 Drawing Sheets

(51) Int. Cl.
H04L 29/06 (2006.01)
H04W 84/12 (2009.01)

(56) References Cited

U.S. PATENT DOCUMENTS

| | | | |
|---|---|---|---|
| 7,254,115 B1 | 8/2007 | Lakhanpal et al. | |
| 2003/0023901 A1 | 1/2003 | Hack et al. | |
| 2004/0233923 A1* | 11/2004 | Fally | H04L 12/462 370/412 |
| 2010/0050058 A1* | 2/2010 | Long | H04L 1/0045 714/776 |
| 2010/0125768 A1* | 5/2010 | Mauchly | H04L 1/1829 714/749 |
| 2012/0079324 A1 | 3/2012 | Aphale | |
| 2012/0084482 A1* | 4/2012 | Yamanaka | G06F 13/385 710/305 |
| 2013/0010848 A1* | 1/2013 | Shimizu | H04L 5/06 375/219 |
| 2013/0275626 A1* | 10/2013 | Kim | G06F 9/52 709/248 |
| 2014/0167930 A1* | 6/2014 | Tabuchi | G08C 17/02 340/12.5 |
| 2017/0034019 A1* | 2/2017 | Nataraj | H04L 43/062 |
| 2017/0238274 A1* | 8/2017 | Zhang | H04W 28/10 455/456.1 |
| 2017/0255476 A1* | 9/2017 | Whitney | G06F 3/048 |

FOREIGN PATENT DOCUMENTS

| | | |
|---|---|---|
| CN | 105808469 A | 7/2016 |
| JP | H10-505700 A | 6/1998 |
| JP | H 11-167630 A | 6/1999 |
| JP | 2001134459 A | 5/2001 |
| JP | 2006304461 A | 11/2006 |
| KR | 10-2006-0127084 A | 12/2006 |
| WO | WO 2010/067471 A1 | 6/2010 |

OTHER PUBLICATIONS

English version of International Search Report of PCT/CN2016/092209, dated Dec. 29, 2016.
Special Edition: Hard Control in the Internet Era, "Chapter 4 Implement IP on NE 2000 Compatible Card and Z80 Microcomputer Board—Production of Ether Parallel I/O Board", dated Jul. 1, 1999, pp. 223-235.
Notice of Allowance issued in Korean Patent Application No. 10-2016-7026879, dated Apr. 18, 2018.
International Search Report for PCT Application No. PCT/CN2016/092209 dated Dec. 29, 2016.
J. Fujimori et al., *A Visualization of Sound Filed by Means of Sensor-Display Composite Array*, The Engineering Sciences Society—The Institute of Electronics, Information and Communication Engineers, vol. J94-A, No. 11, pp. 846-853, Nov. 1, 2011.

* cited by examiner

DATA PROCESSING METHOD, DATA PROCESSING DEVICE, TERMINAL AND SMART DEVICE

CROSS-REFERENCE TO RELATED APPLICATION

This application is based on and claims priority to Chinese Patent Application No. 201610162171.3, filed on Mar. 21, 2016, the entire contents of which are incorporated herein by reference.

TECHNICAL FIELD

The present disclosure relates to the field of smart devices, and more particularly, to a data processing method, a data processing device, a terminal and a smart device.

BACKGROUND

With the development of wireless communication technologies such as Wireless Fidelity (Wi-Fi), Bluetooth and the like, a Wi-Fi module may be provided in a smart device, such that the smart device can communicate with a cloud server and can be controlled by a terminal. For example, the Wi-Fi module may usually consist of a Wi-Fi chip and a microcontroller unit (MCU), wherein the Wi-Fi chip is configured to communicate with other devices, and the MCU is configured to work with a built-in MCU of the smart device to control the smart device.

In the relevant prior art, the built-in MCU and the Wi-Fi module in the smart device communicate with each other via two serial lines. Two debugging tools for serial port will be required to check data transmitted on the two serial lines, which is inconvenient to determine data receiving and sending sequences and may cause great difficulty in debugging.

Specifically, since data streams rather than data packets are transmitted on the serial lines, general serial debugging tools has no time-dependent information, which is inconvenient to determine receiving and sending sequences of the data transmitted on the serial lines, and thus causing great difficulty in debugging. For example, a serial debugging tool 1 acquires data A1, A2 and A3, and a serial debugging tool 2 acquires data B1, B2 and B3. In this case, sequences of A1 and B1, A2 and B2 as well as A3 and B3 are unable to be determined. According to network protocols, there may even be a case in which receiving and sending sequences of two data packets are opposite.

SUMMARY

According to a first aspect of embodiments of the present disclosure, there is provided a method for processing data, comprising: acquiring data packets having respective serial numbers and transmitted between a first microcontroller unit (MCU) and a second MCU of a smart device, the second MCU being provided in a Wireless Fidelity (Wi-Fi) module of the smart device; and processing and displaying the acquired data packets based on the respective serial numbers so as to debug the second MCU.

According to a second aspect of embodiments of the present disclosure, there is provided a method for processing data, comprising: determining data packets transmitted from and to a first MCU of a smart device; adding a respective serial number to each of the data packets; sending the data packets added with the respective serial numbers to a terminal such that the terminal processes and displays the data packets based on the respective serial numbers and performs debugging.

According to a third aspect of embodiments of the present disclosure, there is provided a terminal, comprising: a processor; and a memory configured to store instructions executable by the processor; wherein, the processor is configured to perform: acquiring data packets having respective serial numbers and transmitted between a first microcontroller unit (MCU) and a second MCU of a smart device, the second MCU being provided in a Wireless Fidelity (Wi-Fi) module of the smart device; and processing and displaying the acquired data packets based on the respective serial numbers so as to debug the second MCU.

According to a fourth aspect of embodiments of the present disclosure, there is provided a smart device, comprising: a processor; and a memory configured to store instructions executable by the processor; wherein, the processor is configured to perform: determining data packets transmitted from and to a first MCU of the smart device; adding a respective serial number to each of the data packets; and sending the data packets added with the respective serial numbers to a terminal such that the terminal processes and displays the data packets based on the respective serial number and performs debugging.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all the implementations consistent with the present disclosure. Instead, they are merely examples of devices and methods consistent with aspects related to the present disclosure as recited in the appended claims.

The terms used herein are merely for describing a particular embodiment, rather than limiting the present disclosure. As used in the present disclosure and the appended claims, terms in singular forms such as "a", "said" and "the" are intended to also include plural forms, unless explicitly dictated otherwise. It should also be understood that the term "and/or" used herein means any one or any possible combination of one or more associated listed items.

It should be understood that, although it may describe an element with a term such as first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when", "where" or "in response to".

Figure 1:
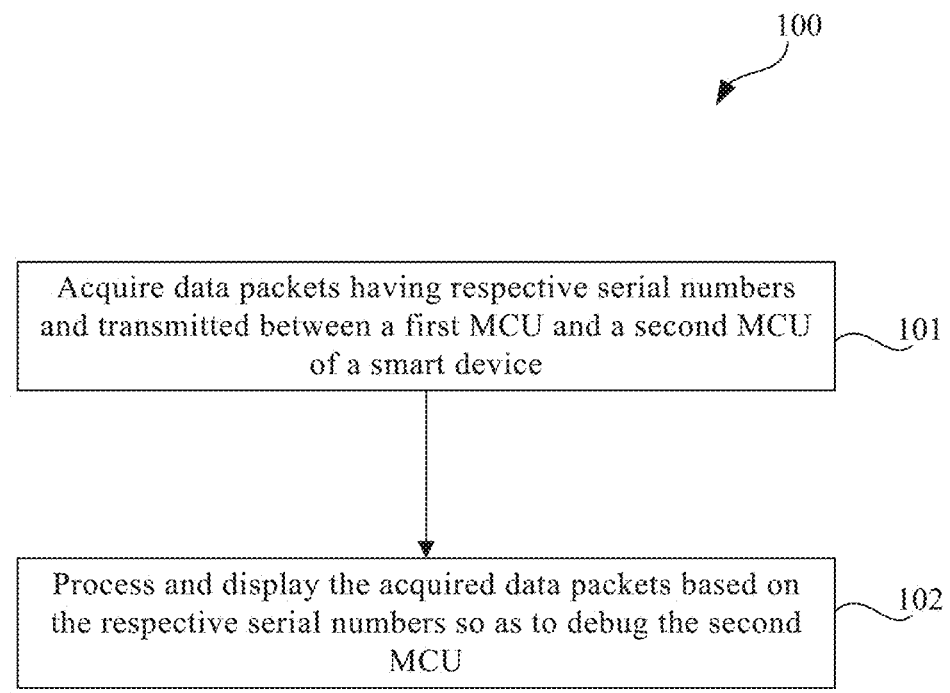
FIG. 1 is a flowchart of a method for data processing according to an exemplary embodiment of the present disclosure.

FIG. 1 is a flowchart of a method 100 for data processing according to an exemplary embodiment of the present disclosure. As shown in FIG. 1, the method 100 may be applied in a terminal, and may include the following steps.

In step 101, data packets having respective serial numbers and transmitted between a first MCU and a second MCU of a smart device are acquired. The second MCU is provided in a Wi-Fi module of the smart device.

In the exemplary embodiment, the smart device is provided with the Wi-Fi module. The Wi-Fi module includes a Wi-Fi chip and the second MCU. The second MCU communicates via the Wi-Fi chip with the first MCU of the smart device, and also communicates with other devices via the Wi-Fi chip.

In the exemplary embodiment, the smart device may access a router such as a smart routing device. The router as the smart routing device may not only have a traditional routing function but also include a standalone operating system and a magnetic disk. The capacity of the magnetic disk may be flexibly configured according to needs, for example, to 1T.

The terminal in the present disclosure may be any Internet-enabled smart terminal, for example, a mobile phone, a tablet PC, a personal digital assistant (PDA) and the like. The terminal may access the router through a wireless local area network, and access a server in a public network through the router.

The terminal may send a control command, through an application (APP) such as a smart home app, to the Wi-Fi module of the smart device so as to control the smart device. The Wi-Fi chip in the Wi-Fi module of the smart device receives the control command, and the second MCU converts, according to a defined protocol format, the received control command into a binary coded string identifiable by the first MCU of the smart device. The second MCU then sends the binary coded string to the first MCU of the smart device through a serial port. The first MCU executes a corresponding function to realize the control by the terminal over the smart device.

In step 102, the data packets are processed and displayed based on the respective serial numbers so as to debug the second MCU.

In the exemplary embodiment, the terminal may acquire the data packets having the respective serial numbers, and process and display the data packets to perform debugging. The terminal is enabled to conveniently and directly determine data receiving and sending sequences based on the respective serial numbers. In this way, it is convenient to debug the second MCU, and to timely discover problems associated with data transmission, thus facilitating user operations.

Figure 2:
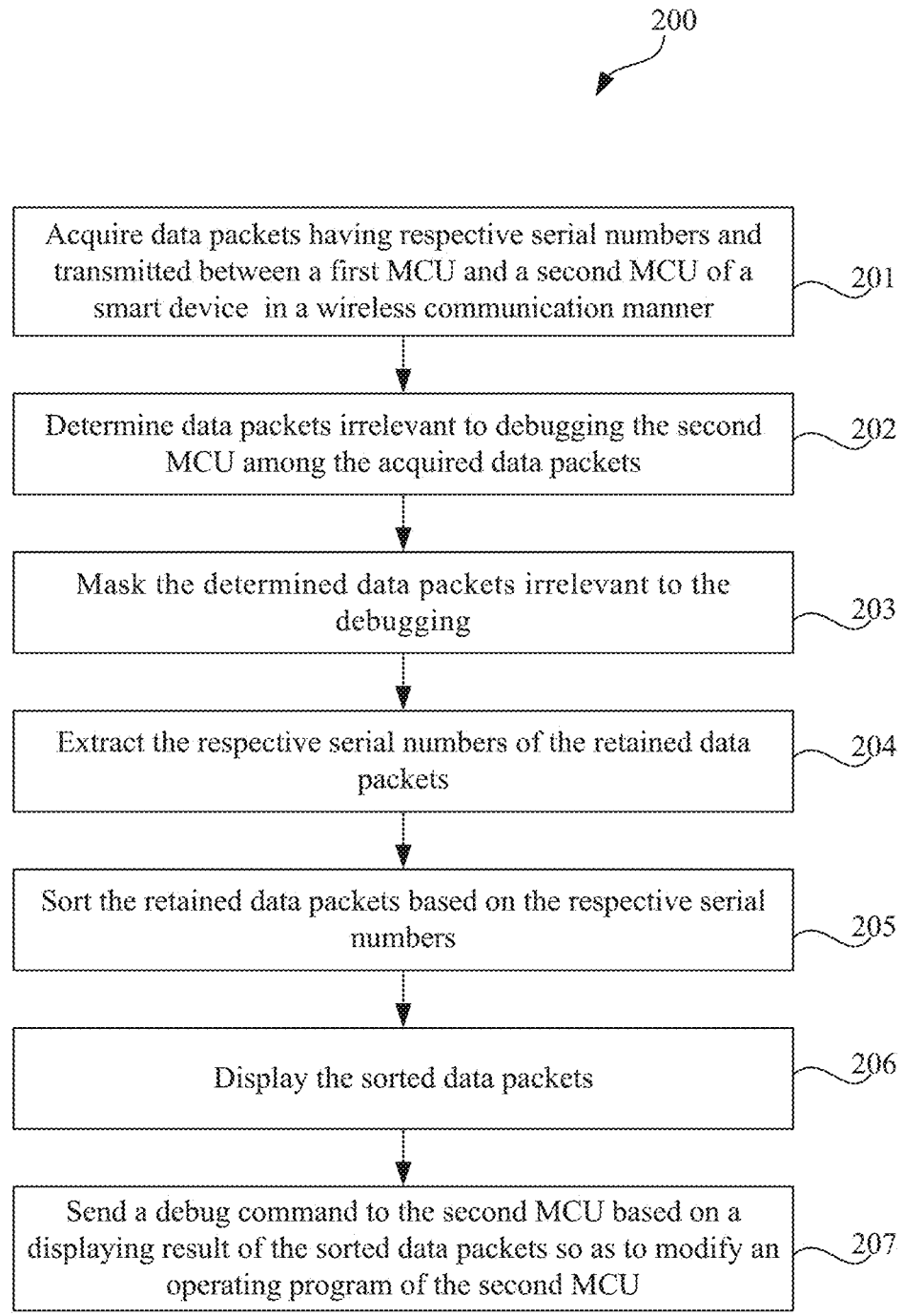
FIG. 2 is a flowchart of a method for data processing according to another exemplary embodiment of the present disclosure.

FIG. 2 is a flowchart of a method 200 for data processing according to another exemplary embodiment of the present disclosure. As shown in FIG. 2, the method 200 may be applied in a terminal, and may include the following steps.

In step 201, data packets having respective serial numbers and transmitted between a first MCU and a second MCU of a smart device are acquired in a wireless communication manner.

In the exemplary embodiment, a Wi-Fi module of the smart device may access a router via Wi-Fi. The router may be connected to the terminal such as a computer, a mobile phone via Wi-Fi, or the router may also be connected with the terminal through a serial line, so that the terminal may acquire in a wireless communication manner the data packets having the respective serial numbers and transmitted between the first MCU and the second MCU.

In some embodiments, the data packets having the respective serial numbers and transmitted between the first MCU and the second MCU of the smart device may also be acquired based on a User Datagram Protocol (UDP) or an Internet Protocol (IP). In such embodiments, the Wi-Fi module may be directly connected with the terminal via a serial line, and then may broadcast, in the form of UDP broadcasting, the data packets transmitted between the first MCU and the second MCU to all the devices within a local area network in the router is located. The terminal may acquire the data packets as long as the terminal remains listening. The Wi-Fi module may also send the data packets to the terminal having a specified IP so that the terminal acquires the data packets.

In step 202, data packets irrelevant to debugging the second MCU among the acquired data packets are determined.

In step 203, the determined data packets irrelevant to the debugging are masked.

In the exemplary embodiment, the data packets are acquired for the purpose of debugging, thus those data packets not suitable for debugging or irreverent to the debugging among the acquired data packets are masked, and only data packets useful for the debugging are retained.

In step 204, the respective serial numbers of the retained data packets are extracted. The data packets are generated and added with the respective serial numbers by the second MCU in the smart device.

In step 205, the retained data packets are sorted based on the respective serial numbers.

In step 206, the sorted data packets are displayed. In this step, information relevant to the data packets, such as log information, may be displayed, and the respective serial numbers of the data packets may also be displayed. A user may analyze whether data transmission between the first MCU and the second MCU is normal based on the log information. The user may also perform the analysis based on the respective serial numbers of the data packets. If a sequence of the displayed data packets is inconsistent with a sequence of the serial numbers, it indicates that there may be problems associated with the data transmission.

In some embodiments, the method 200 may also include the following step 207. In step 207, a debug command is sent to the second MCU based on a display result of the sorted data packets, so as to modify an operating program of the second MCU.

In one exemplary embodiment, the user may modify the operating program of the second MCU based on the analysis results, or may send a debug command to the second MCU so as to modify the operating program.

In the method 200, the first MCU and the second MCU may be connected to each other via only one serial line. Further, the data streams transmitted between the second MCU and the first MCU are packetized by the second MCU, and added with the respective serial numbers according to the packet sequence. Thereby, the contents displayed on the terminal include information on the data packets and also include the respective serial numbers, which may be used to perform analysis and debuging based on the receiving and sending sequence of the data packets.

In the exemplary embodiment, the acquiring and displaying of the data packets may be realized by python script or any other suitable implementation manner.

Figure 3:
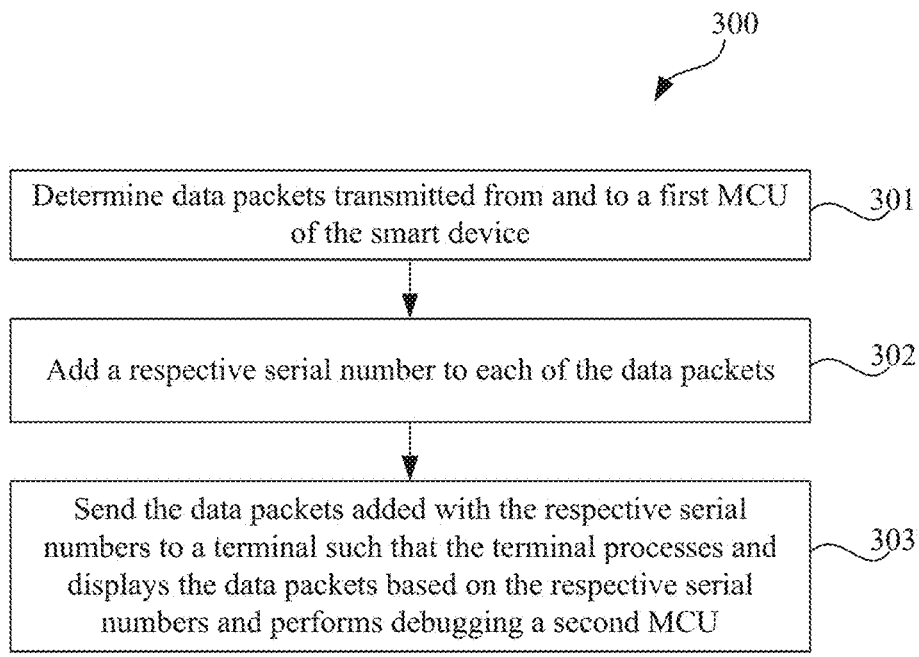
FIG. 3 is a flowchart of a method for data processing according to yet another exemplary embodiment of the present disclosure.

FIG. 3 is a flowchart of a method 300 for data processing according to yet another exemplary embodiment. As shown in FIG. 3, the method 300 may be applied in a smart device, and may include the following steps.

In step 301, data packets transmitted from and to a first MCU of the smart device are determined. In this step, the data packets transmitted from and to the first MCU are determined by a second MCU in a Wi-Fi module provided in the smart device.

In step 302, a respective serial number is added to each of the data packets.

In step 303, the data packets added with the respective serial numbers are sent to a terminal such that the terminal processes and displays the data packets based on the respective serial numbers and performs debugging.

In the method 300, the second MCU in the smart device may add a respective serial number to each of the determined data packets, such that contents and the respective serial numbers of the data packets may be displayed on the terminal, which is used to determine the receiving and sending sequences of the data packets based on the respective serial numbers, and to perform the debugging, As such, it also facilitates operations of the user and improves user experience.

Figure 4:
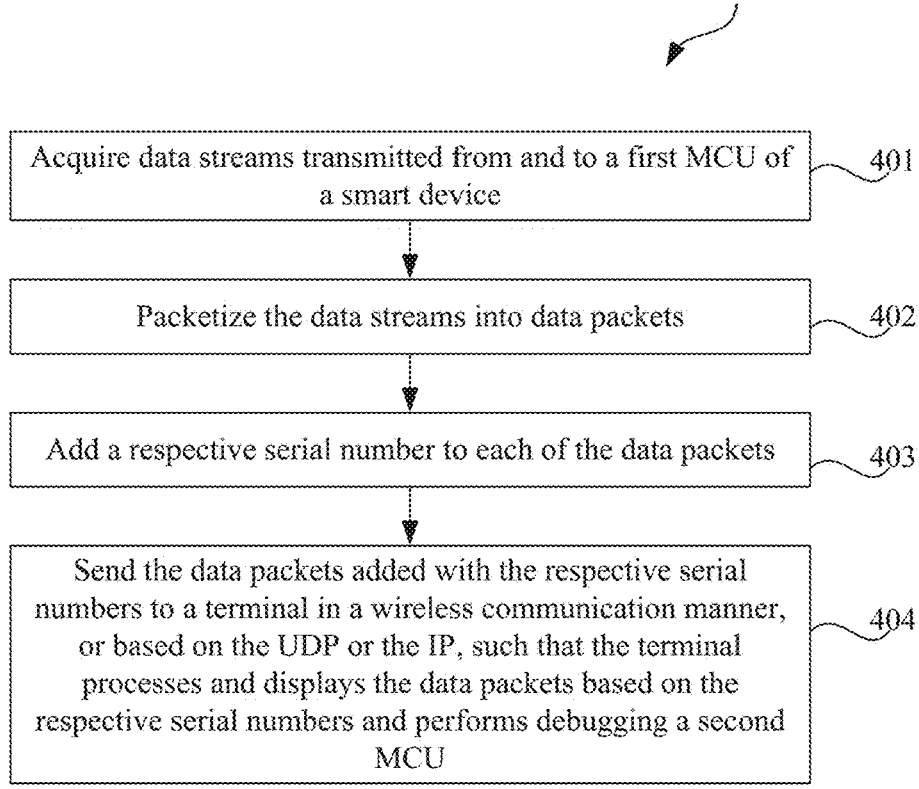
FIG. 4 is a flowchart of a method for data processing according to still yet another exemplary embodiment of the present disclosure.

FIG. 4 is a flowchart of a method 400 for data processing according to an exemplary embodiment. As shown in FIG. 4, the method 400 may be applied in a smart device, and may include the following steps.

In step 401, data streams transmitted from and to a first MCU of the smart device are acquired.

In step 402, the data streams are packetized into data packets. In this step, the second MCU packetizes the data streams into the data packets in order to add a respective serial number to each of the data packets.

In step 403, the respective serial number is added to each of the data packets. In this step, the second MCU may add the respective serial number to each of the data packets based on a sequence of packetizing the data stream.

In step 404, the data packets added with the respective serial numbers are sent to a terminal via a wireless communication or based on the UDP or the IP. Accordingly, the terminal processes and displays the data packets based on the respective serial numbers and performs debugging.

In the method 400, the smart device may send the data packets to the terminal in a wireless communication manner, thereby costs of the serial lines can be saved. The smart device may also send the data packets to the terminal based on the UDP or the IP, and no scanning by the terminal is needed, thereby to enable the terminal to timely monitor the data packets transmitted between the first MCU and the second MCU.

Figures 5A, 5B:
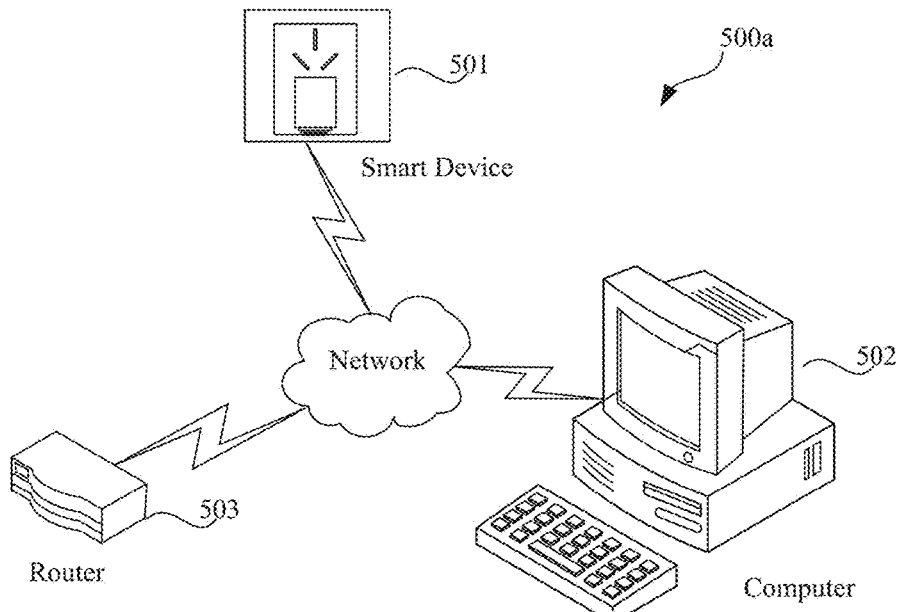
FIG. 5A is a schematic diagram of a system for data processing according to an exemplary embodiment of the present disclosure.
FIG. 5B is a diagram illustrating results of data processing in the system of FIG. 5A according to an exemplary embodiment of the present disclosure.

FIG. 5A is a schematic diagram of a system 500a in which the above methods illustrated in FIGS. 1-4 may be applied, according to an exemplary embodiment of the present disclosure. As shown in FIG. 5A, the system 500a may include a smart device 501 having a first MCU. The smart device 501 also includes a Wi-Fi module. The Wi-Fi module includes a Wi-Fi chip and a second MCU. The system 500a may further include a terminal, such as a computer 502, and a router 503, wherein the smart device 501 wirelessly accesses the router 503 through the Wi-Fi module, and the router 503 wirelessly accesses the computer 502. The second MCU acquires the data streams transmitted between the second MCU and the first MCU, packetizes the acquired data streams into data packets, and adds a respective serial number to each of the data packets, and then broadcasts, e.g., in the form of UPD broadcasting, the data packets added with the respective serial numbers to a local area network in which the router 503 is located. The computer 502 in the local area network monitors the data packets broadcasted by the second MCU, and acquires the monitored data packets. The computer 502 masks data packets irrevelant to the debugging among the acquired data packets, and then extracts the respective serial numbers of the retained data packets. The computer sorts the retained data packets based on the respective serial numbers, and displays the sorted data packets and relevant data. As illustrated in FIG. 5B, a user can determine whether there are problems associated with data transmission based on the sequence and contents of the displayed data packets, so as to debug the second MCU.

Corresponding to the foregoing embodiments of the methods for processing data, the present disclosure further provides embodiments of devices for processing data.

Figure 6:
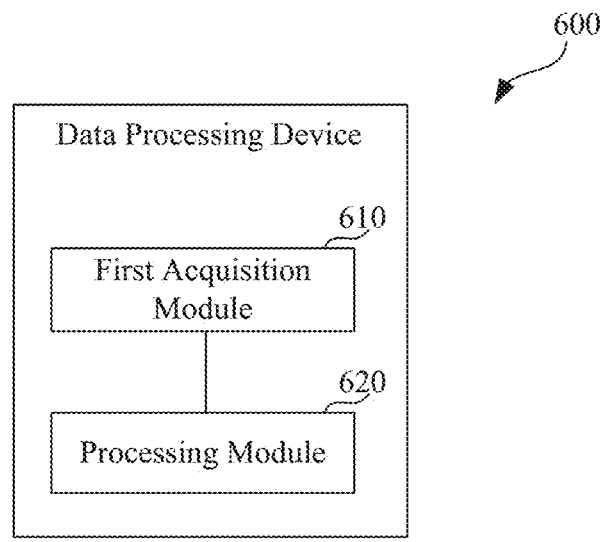
FIG. 6 is a block diagram of a device for data processing according to an exemplary embodiment of the present disclosure.

FIG. 6 is a block diagram of a device 600 for data processing according to an exemplary embodiment of the present disclosure. The device 600 may be used to perform the method 100 shown in FIG. 1. As shown in FIG. 6, the device 600 may include a first acquisition module 610 and a processing module 620.

The first acquisition module 610 is configured to acquire data packets having respective serial numbers and transmitted between a first MCU and a second MCU of a smart device. The second MCU is provided in a Wi-Fi module of the smart device.

The processing module 620 is configured to process and display the data packets acquired by the first acquisition module 610 based on the respective serial numbers so as to debug the second MCU.

In the above exemplary embodiment, the device 600 may acquire the data packets having the respective serial numbers, and process and display the data packets, so as to perform debugging. The device 600 is able to conveniently and directly determine data receiving and sending sequences based on the respective serial numbers. In this way, it is convenient to debug the second MCU, and discover problems existing in data transmission timely, and also facilitate the user's operations.

Figure 7:
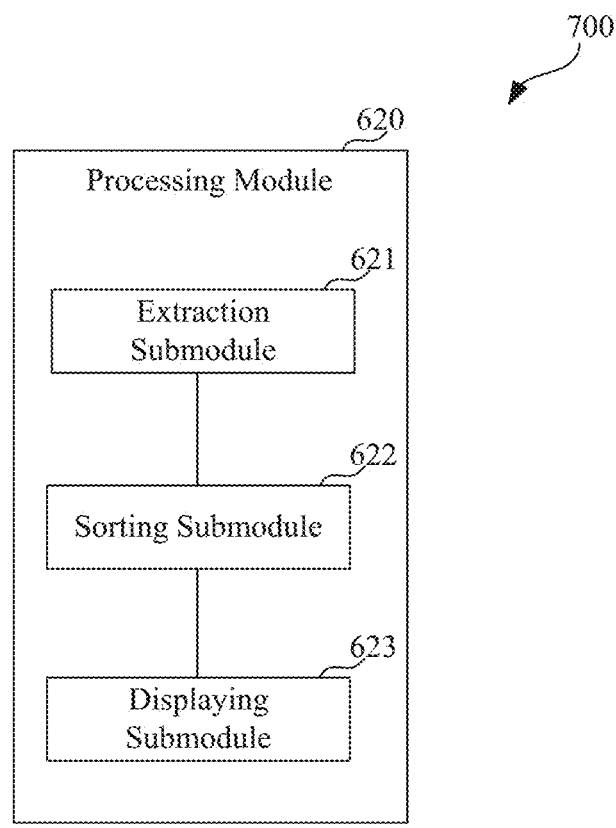
FIG. 7 is a block diagram of a device for data processing according to another exemplary embodiment of the present disclosure.

FIG. 7 is a block diagram of a device 700 for data processing according to another exemplary embodiment of the present disclosure. For example, the device 700 may be the processing module 620 (FIG. 6). The processing module 620 may include an extraction submodule 621, a sorting submodule 622, and a displaying submodule 623.

The extraction submodule 621 is configured to extract the respective serial number carried in each of the data packets. The respective serial numbers are added into each of the data packets by the second MCU.

The sorting submodule 622 is configured to sort the data packets based on the respective serial numbers extracted by the extraction submodule 621.

The displaying submodule 623 is configured to display the data packets sorted by the sorting submodule 622.

In the present embodiment, the device 700 may extract the respective serial numbers carried in the data packets, which facilitates the analysis of the data packets based on the respective serial numbers of the data packets. If a sequence of the displayed data packet is inconsistent with a sequence of the serial numbers, it indicates that there may be a problem existing in the data transmission, which provides convenience for the debugging.

Figure 8:
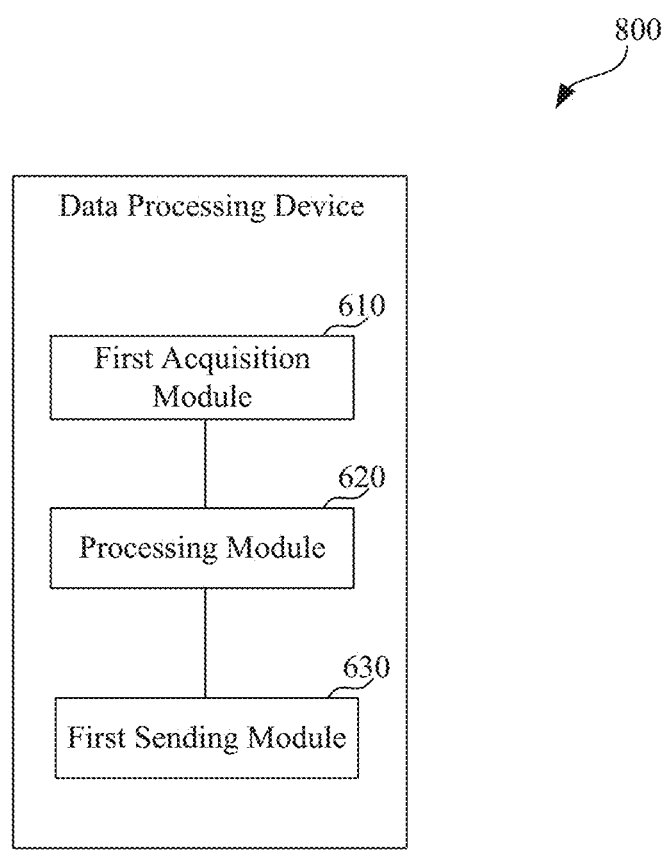
FIG. 8 is a block diagram of a device for data processing according to yet another exemplary embodiment of the present disclosure.

FIG. 8 is a block diagram of a device 800 for data processing according to yet another exemplary embodiment of the present disclosure. As shown in FIG. 8, the device 800 may further include a first sending module 630 in addition to the first acquisition module 610 and the processing module 620 (FIG. 6).

The first sending module 630 is configured to send a debug command to the second MCU based on a displaying result of the sorted data packets so as to modify an operating program of the second MCU.

In the above embodiment, the device 800 may instruct the second MCU to modify programs based on analysis results of the data packets, so as to address the problems existing in the data transmission. In this way, normal transmission of data will be guaranteed.

Figure 9:
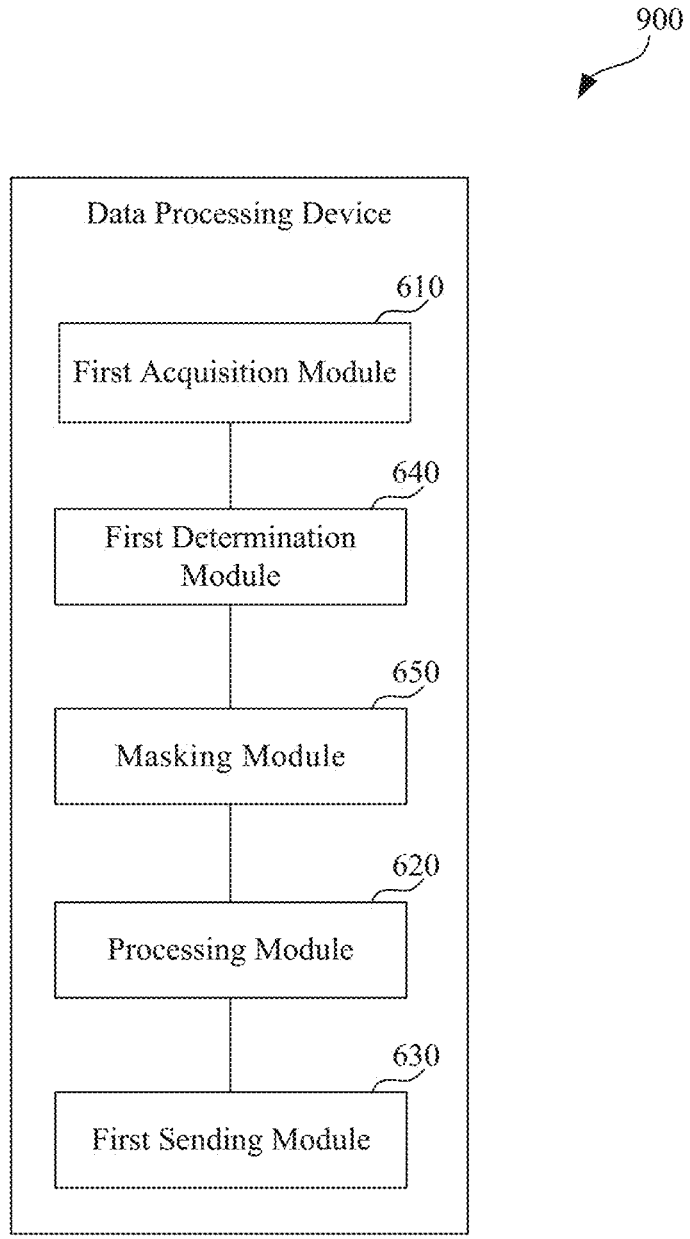
FIG. 9 is a block diagram of a device for data processing according to still yet another exemplary embodiment of the present disclosure.

FIG. 9 is a block diagram of a device 900 for data processing according to still yet another exemplary embodiment of the present disclosure. As shown in FIG. 9, the device 900 may further include a first determination module 640 and a masking module 650 in addition to the modules in the device 800 (FIG. 8).

The first determination module 640 is configured to determine data packets irrelevant to the debugging among the acquired data packets.

The masking module 650 is configured to mask the data packets determined by the first determination module 640.

In the above embodiment, the device 900 may screen the acquired data packets and mask data packets irrelevant to the debugging and only retain data packets useful for the debugging. In such a manner, useless information will not be displayed and no interference with the debugging will be caused.

Figure 10:
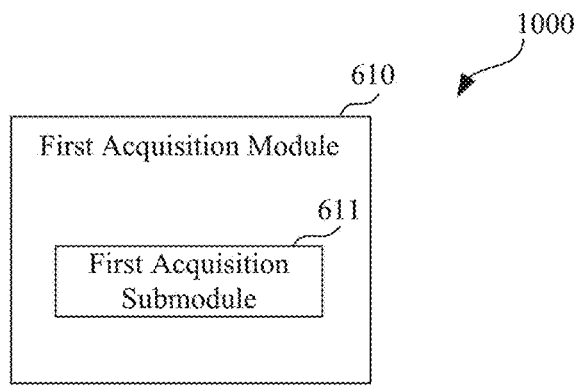
FIG. 10 is a block diagram of a device for data processing according to still yet another exemplary embodiment of the present disclosure.

FIG. 10 is a block diagram of a device 1000 for data processing according to an exemplary embodiment of the present disclosure. For example, the device 1000 may be the first acquisition module 610 (FIG. 6). The first acquisition module 610 may include a first acquisition submodule 611.

The first acquisition submodule 611 is configured to acquire, in a wireless communication manner, the data packets having the respective serial numbers and transmitted between the first MCU and the second MCU of the smart device.

In the above embodiment, the device 1000 may acquire the data packets in a wireless communication manner, instead of using two serial lines as in the relevant prior art, so that costs of the serial lines can be saved.

Figure 11:
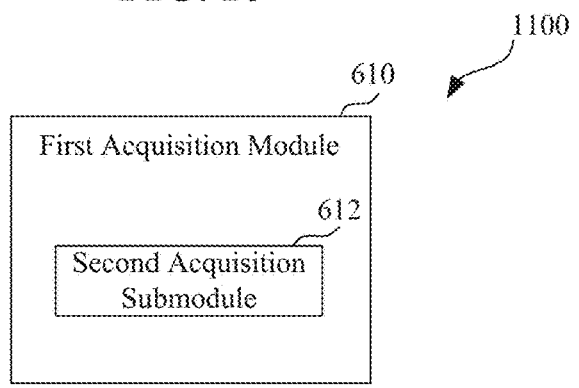
FIG. 11 is a block diagram of a device for data processing according to still yet another exemplary embodiment of the present disclosure.

FIG. 11 is a block diagram of a device 1100 for data processing according to still yet another exemplary embodiment of the present disclosure. For example, the device 1100 may be the first acquisition module 610 (FIG. 6). The first acquisition module 610 may include a second acquisition submodule 612.

The second acquisition submodule 612 is configured to acquire, based on a UDP or an IP, the data packets having the respective serial numbers and transmitted between the first MCU and the second MCU of the smart device.

In the above embodiment, the device 1100 may acquire the data packets based on a UDP or an IP, thereby, an acquisition rate of the data packets is increased, and packet loss rate is reduced.

The devices 600-1100 for processing data in the foregoing embodiments shown in FIGS. 6-11, respectively, may be applied in a terminal.

Figure 12:
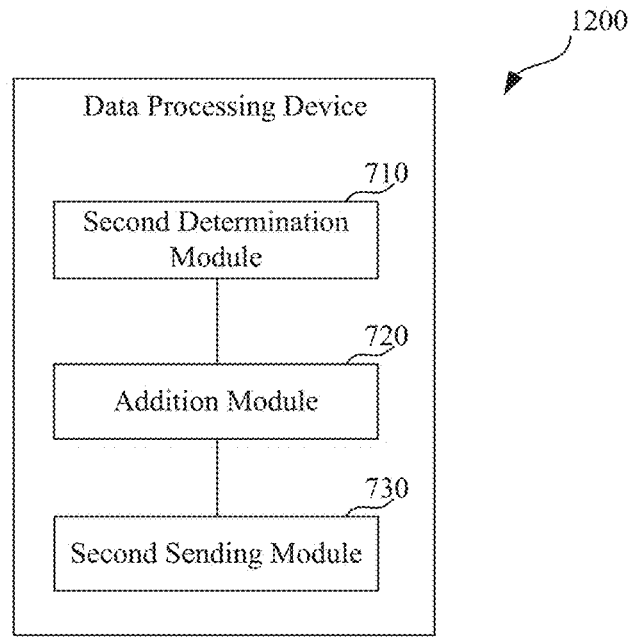
FIG. 12 is a block diagram of a device for data processing according to still yet another exemplary embodiment of the present disclosure.

FIG. 12 is a block diagram of a device 1200 for data processing according to still yet another exemplary embodiment of the present disclosure. As shown in FIG. 12, the device 1200 may be applied in a smart device, and may be used to perform the method 300 illustrated in FIG. 3. The device 1200 may include a second determination module 710, an addition module 720, and a second sending module 730.

The second determination module 710 is configured to determine data packets transmitted from and to a first MCU of the smart device.

The addition module 720 is configured to add a respective serial number to each of the data packets determined by the second determination module 710.

The second sending module 730 is configured to send the data packets added with the respective serial numbers by the addition module 720 to a terminal such that the terminal processes and displays the data packets based on the respective serial numbers and performs debugging.

In the above embodiment, a second MCU in a Wi-Fi module in the smart device may determine the data packets transmitted from and to the first MCU of the smart device, and add a respective serial number to each of the determined data packets, such that contents and the respective serial numbers of the data packets may be displayed on the terminal. This is used to determine receiving and sending sequences of the data packets based on the respective serial numbers, and to perform the debugging. It also facilitates operations of the user and optimizes user experience.

Figure 13:
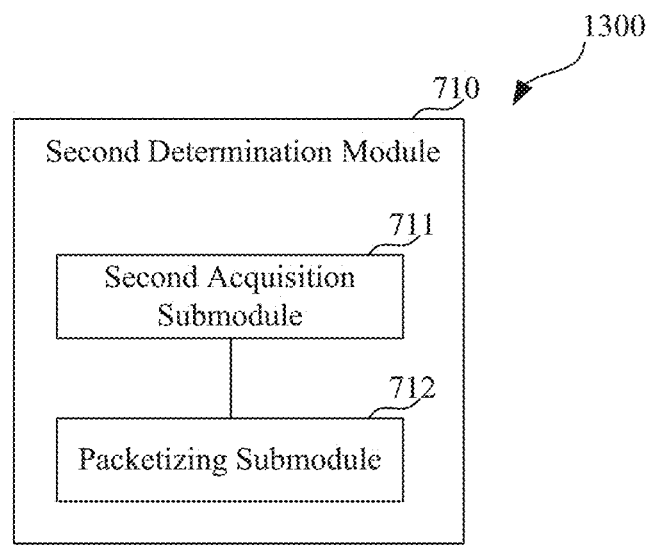
FIG. 13 is a block diagram of a device for data processing according to still yet another exemplary embodiment of the present disclosure.

FIG. 13 is a block diagram of a device 1300 for data processing according to still yet another exemplary embodiment of the present disclosure. For example, the device 1300 may be the second determination module 710 (FIG. 12). As shown in FIG. 13, the second determination module 710 may include a second acquisition submodule 711 and a packetizing submodule 712.

The second acquisition submodule 711 is configured to acquire data streams transmitted from and to the first MCU of the smart device.

The packetizing submodule 712 is configured to packetize the data streams acquired by the second acquisition submodule 711 into data packets.

In the above embodiment, the second MCU in the smart device may packetize the acquired data streams which are transmitted between the second MCU and the first MCU, to add the respective serial number to each of the data packets, which facilitates analysis and debugging of the data packets by the terminal.

Figure 14:
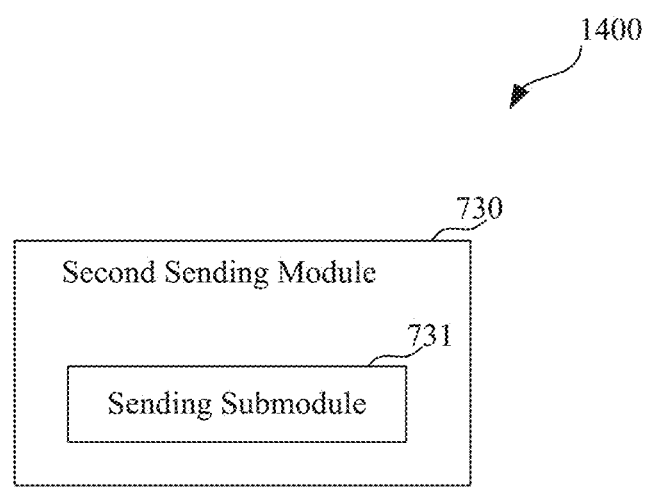
FIG. 14 is a block diagram of a device for data processing according to still yet another exemplary embodiment of the present disclosure.

FIG. 14 is a block diagram of a device 1400 for data processing according to yet still another exemplary embodiment of the present disclosure. For example, the device 1400 may be the second sending module 730 (FIG. 12). As shown in FIG. 14, the second sending module 730 may include a sending submodule 731.

The sending submodule 731 is configured to send the data packets added with the respective serial numbers by the addition module 720 to the terminal in a wireless communication manner, or based on a UDP or an IP.

In the above embodiment, the second MCU in the smart device may send the data packets in a wireless communication manner, rather than sending the data packets through two serial lines as in the relevant prior art, so that costs of the serial lines can be saved. The second MCU may also send the data packets based on a UDP or an IP, thereby, a transmission rate of the data packets is increased, and packet loss rate is reduced.

Corresponding to FIG. 6, the present disclosure further provides a terminal. The terminal may include a processor and a memory configured to store instructions executable by the processor. The processor is configured to perform acquiring data packets having respective serial numbers and transmitted between a first MCU and a second MCU of a smart device. The second MCU is provided in a Wi-Fi module of the smart device. The processor is further configured to perform processing and displaying the data packets based on the respective serial numbers so as to debug the second MCU.

Corresponding to FIG. 12, the present disclosure further provides a smart device. The smart device may include a processor and a memory configured to store instructions executable by the processor. The processor is configured to perform determining data packets transmitted from and to a first MCU of the smart device; adding a respective serial number to each of the data packets; and sending the data packets added with the respective serial numbers to a terminal such that the terminal processes and displays the data packets based on the respective serial numbers and performs debugging.

Figure 15:
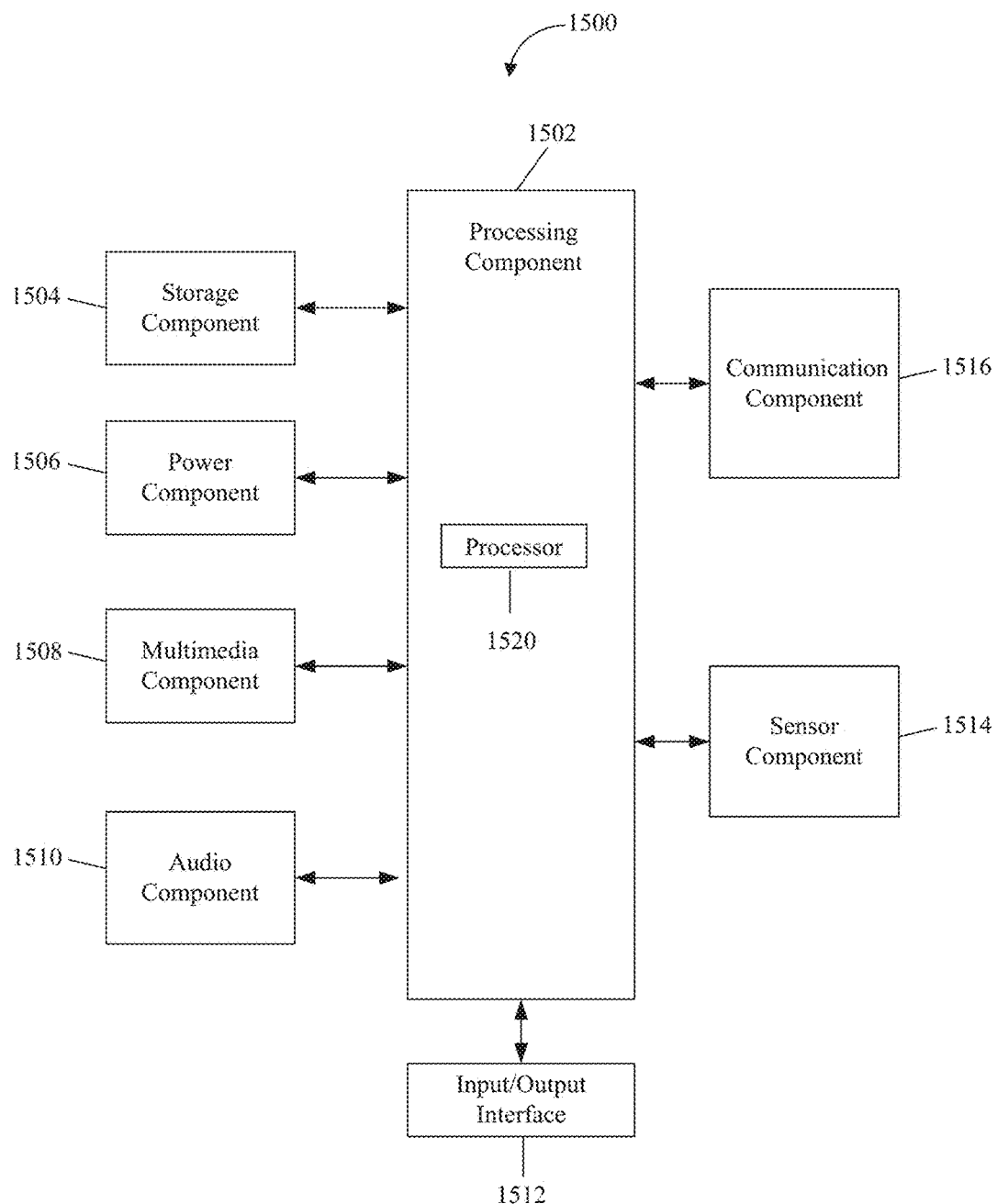
FIG. 15 is a block diagram of a data processing device according to an exemplary embodiment of the present disclosure.

FIG. 15 is a block diagram of a data processing device 1500 according to an exemplary embodiment of the present disclosure. For example, the device 1500 is a terminal, such as a mobile phone, a computer, a digital broadcast terminal, a messaging device, a gaming console, a tablet, a medical device, exercise equipment, a personal digital assistant and the like.

Referring to FIG. 15, the device 1500 may include one or more of the following components: a processing component 1502, a storage component 1504, a power component 1506, a multimedia component 1508, an audio component 1510, an input/output (I/O) interface 1512, a sensor component 1514, and a communication component 1516.

The processing component 1502 usually controls overall operations of the device 1500, such as operations associated with display, telephone calls, data communications, camera operations and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The storage component 1504 is configured to store various types of data to support the operation of the device 1500. Examples of such data include instructions for any application or method operated on the device 1500, contact data, phonebook data, messages, pictures, videos, etc. The storage component 1504 may be implemented by any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1506 provides power to various components of the device 1500. The power component 1506 may include a power management system, one or more power sources, and other components associated with the generation, management, and distribution of power in the device 1500.

The multimedia component 1508 includes a screen for providing an output interface between the device 1500 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1508 includes a front camera and/or a rear camera. The front camera and/or the rear camera may receive external multimedia data while the device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 includes a microphone configured to receive an external audio signal when the device 1500 is in an operation mode, such as a call mode, a recording mode, and a voice recognition mode. The received audio signal may be further stored in the storage component 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, a button, and the like. The button may include, but not limited to: a home button, a volume button, a starting button and a locking button.

The sensor component 1514 includes one or more sensors to provide status assessments of various aspects of the device 1500. For instance, the sensor component 1514 may detect an open/closed status of the device 1500, relative position of components, e.g., the display and the keyboard, of the device 1500, a change in position of the device 1500 or a component of the device 1500, a presence or absence of an user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may further include a light sensor, such as a CMOS or CCD image sensor, for use in imaging applications. In some embodiments, the sensor component 1514 may further include an accelerometer sensor, a gyroscope sensor, a magnetic sensor, a pressure sensor, a microwave sensor, or a temperature sensor.

The communication component 1516 is configured to facilitate communication, in a wire or wireless manner, between the device 1500 and other devices. The device 1500 can access a wireless network based on a communication standard, such as WiFi, 2G, 3G, or 4G, or a combination thereof. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-bandwidth (UWB) technology, a Bluetooth (BT) technology, and other technologies.

In exemplary embodiments, the device 1500 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the above described methods.

In exemplary embodiments, there further provides a non-transitory computer-readable storage medium including instructions, such as included in the storage component 1504, executable by the processor 1520 in the device 1500, for performing the above described methods. For example, the non-transitory computer-readable storage medium may be a ROM, a random access memory (RAM), a CD-ROM, a magnetic tape, a floppy disc, an optical data storage device and the like.

Figure 16:
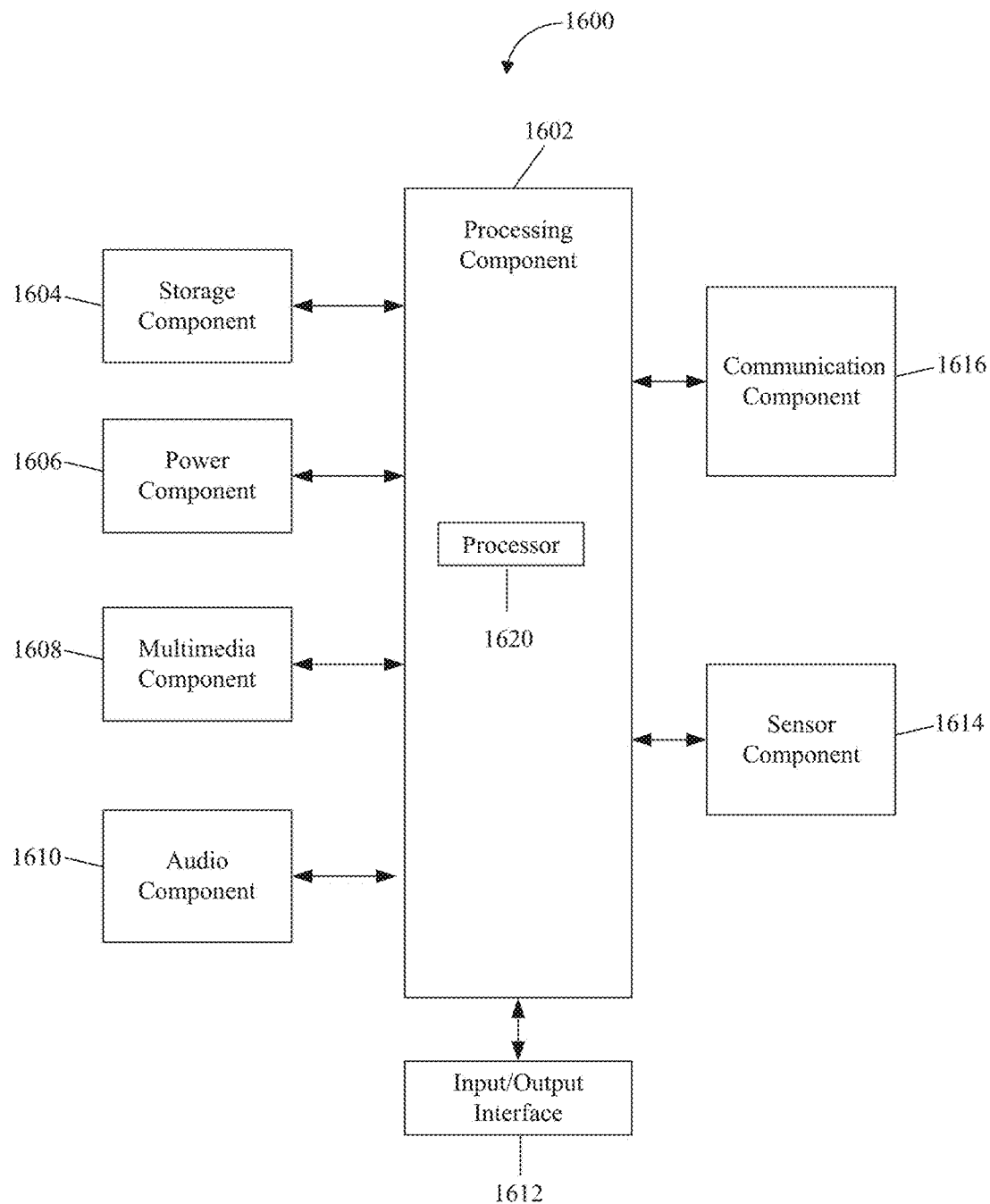
FIG. 16 is a block diagram of a data processing device according to another exemplary embodiment of the present disclosure.

FIG. 16 is a block diagram of a data processing device 1600 according to an exemplary embodiment of the present disclosure. For example, the device 1600 is a smart device.

Referring to FIG. 16, the device 1600 may include one or more of the following components: a processing component 1602, a storage component 1604, a power component 1606, a multimedia component 1608, an audio component 1610, an input/output (I/O) interface 1612, a sensor component 1614, and a communication component 1616.

The processing component 1602 usually controls overall operations of the device 1600, such as operations associated with display, telephone calls, data communications, camera operations and recording operations. The processing component 1602 may include one or more processors 1620 to execute instructions to perform all or part of the steps in the above described methods. Moreover, the processing component 1602 may include one or more modules which facilitate the interaction between the processing component 1602 and other components. For instance, the processing component 1602 may include a multimedia module to facilitate the interaction between the multimedia component 1608 and the processing component 1602.

The storage component 1604 is configured to store various types of data to support the operation of the device 1600. Examples of such data include instructions for any application or method operated on the device 1600, contact data, phonebook data, messages, pictures, videos, etc. The storage component 1604 may be implemented by any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power component 1606 provides power to various components of the device 1600. The power component 1606 may include a power management system, one or more power sources, and other components associated with the generation, management, and distribution of power in the device 1600.

The multimedia component 1608 includes a screen for providing an output interface between the device 1600 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1608 includes a front camera and/or a rear camera. The front camera and/or the rear camera may receive external multimedia data while the device 1600 is in an operation mode, such as a photographing mode or a video mode. Each of the front camera and the rear camera may be a fixed optical lens system or have focus and optical zoom capability.

The audio component 1610 is configured to output and/or input audio signals. For example, the audio component 1610 includes a microphone configured to receive an external audio signal when the device 1600 is in an operation mode, such as a call mode, a recording mode, and a voice recognition mode. The received audio signal may be further stored in the storage component 1604 or transmitted via the communication component 1616. In some embodiments, the audio component 1610 further includes a speaker to output audio signals.

The I/O interface 1612 provides an interface between the processing component 1602 and peripheral interface modules, such as a keyboard, a click wheel, a button, and the like. The button may include, but not limited to: a home button, a volume button, a starting button and a locking button.

The sensor component 1614 includes one or more sensors to provide status assessments of various aspects of the device 1600. For instance, the sensor component 1614 may detect an open/closed status of the device 1600, relative position of components, e.g., the display and the keyboard, of the device 1600, a change in position of the device 1600 or a component of the device 1600, a presence or absence of an user contact with the device 1600, an orientation or an acceleration/deceleration of the device 1600, and a change in temperature of the device 1600. The sensor component 1614 may include a proximity sensor configured to detect the presence of nearby objects without any physical contact. The sensor component 1614 may further include a light sensor, such as a CMOS or CCD image sensor, for use in imaging applications. In some embodiments, the sensor component 1614 may further include an accelerometer sensor, a gyroscope sensor, a magnetic sensor, a pressure sensor, a microwave sensor, or a temperature sensor.

The communication component 1616 is configured to facilitate communication, in a wire or wireless manner, between the device 1600 and other devices. The device 1600 can access a wireless network based on a communication standard, such as WiFi, 2G, 3G, or 4G, or a combination thereof. In one exemplary embodiment, the communication component 1616 receives a broadcast signal or broadcast associated information from an external broadcast management system via a broadcast channel. In one exemplary embodiment, the communication component 1616 further includes a near field communication (NFC) module to facilitate short-range communications. For example, the NFC module may be implemented based on a radio frequency identification (RFID) technology, an infrared data association (IrDA) technology, an ultra-bandwidth (UWB) technology, a Bluetooth (BT) technology, and other technologies.

In exemplary embodiments, the device 1600 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors or other electronic components, for performing the above described methods.

In exemplary embodiments, there further provides a non-transitory computer-readable storage medium including instructions, such as included in the storage component 1604, executable by the processor 1620 in the device 1600, for performing the above described methods. For example, the non-transitory computer-readable storage medium may be a ROM, a random access memory (RAM), a CD-ROM, a magnetic tape, a floppy disc, an optical data storage device and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for processing data, comprising:
   acquiring data packets having respective serial numbers and transmitted between a first microcontroller unit (MCU) and a second MCU of a smart device, the second MCU being provided in a Wireless Fidelity (Wi-Fi) module of the smart device; and
   processing and displaying the acquired data packets based on the respective serial numbers so as to debug the second MCU,
   wherein the processing and displaying the acquired data packets based on the respective serial numbers comprises:
   extracting the respective serial numbers of the acquired data packets, the respective serial numbers being added to the acquired data packets by the second MCU;
   sorting the acquired data packets based on the respective serial numbers; and
   displaying the sorted data packets.

2. The method of claim 1, further comprising:
   sending a debug command to the second MCU based on a displaying result of the acquired data packets so as to modify an operating program of the second MCU.

3. The method of claim 1, further comprising:
   determining, from the acquired data packets, data packets irrelevant to debugging the second MCU; and
   masking the determined data packets.

4. The method of claim 1, wherein the acquiring data packets having respective serial numbers and transmitted between the first MCU and the second MCU of the smart device comprises:
   acquiring, in a wireless communication manner, the data packets having respective serial numbers and transmitted between the first MCU and the second MCU of the smart device.

5. The method of claim 1, wherein the acquiring data packets having respective serial numbers and transmitted between the first MCU and the second MCU of the smart device comprises:
   acquiring, based on a User Datagram Protocol (UDP) or an Internet Protocol (IP), the data packets having respective serial numbers and transmitted between the first MCU and the second MCU of the smart device.

6. A method for processing data, comprising:
   determining data packets transmitted from and to a first MCU of a smart device;
   adding a respective serial number to each of the data packets; and
   sending the data packets added with the respective serial numbers to a terminal such that the terminal processes and displays the data packets based on the respective serial numbers and performs debugging, wherein the terminal processing and displaying the data packets based on the respective serial numbers comprises:
extracting the respective serial numbers of the data packets;
sorting the data packets based on the respective serial numbers; and
displaying the sorted data packets.

7. The method of claim 6, further comprising:
acquiring data streams transmitted from and to the first MCU of the smart device; and
packetizing the data streams into the data packets.

8. The method of claim 6, wherein the sending the data packets added with the respective serial numbers to a terminal comprises:
sending the data packets added with the respective serial numbers to the terminal in a wireless communication manner, or based on a User Datagram Protocol (UDP) or an Internet Protocol (IP).

9. A terminal, comprising:
a processor; and
a memory configured to store instructions executable by the processor;
wherein, the processor is configured to perform:
acquiring data packets having respective serial numbers and transmitted between a first microcontroller unit (MCU) and a second MCU of a smart device, the second MCU being provided in a Wireless Fidelity (Wi-Fi) module of the smart device; and
processing and displaying the acquired data packets based on the respective serial numbers so as to debug the second MCU;
wherein the processing and displaying the acquired data packets based on the respective serial numbers comprises:
extracting the respective serial numbers of the acquired data packets, the respective serial numbers being added to the acquired data packets by the second MCU;
sorting the acquired data packets based on the respective serial numbers; and
displaying the sorted data packets.

10. The terminal of claim 9, wherein the processor is further configured to perform:
sending a debug command to the second MCU based on a displaying result of the acquired data packets so as to modify an operating program of the second MCU.

11. The terminal of claim 9, wherein the processor is further configured to perform:
determining, from the acquired data packets, data packets irrelevant to debugging the second MCU; and
masking the determined data packets.

12. The terminal of claim 9, wherein the processor is further configured to perform:
acquiring, in a wireless communication manner, the data packets having respective serial numbers and transmitted between the first MCU and the second MCU of the smart device.

13. The terminal of claim 9, wherein the processor is further configured to perform:
acquiring, based on a User Datagram Protocol (UDP) or an Internet Protocol (IP), the data packets having respective serial numbers and transmitted between the first MCU and the second MCU of the smart device.

14. A smart device, comprising:
a processor; and
a memory configured to store instructions executable by the processor;
wherein, the processor is configured to perform:
determining data packets transmitted from and to a first MCU of the smart device;
adding a respective serial number to each of the data packets; and
sending the data packets added with the respective serial numbers to a terminal such that the terminal processes and displays the data packets based on the respective serial number and performs debugging,
wherein the terminal processing and displaying the data packets based on the respective serial numbers comprises:
extracting the respective serial numbers of the data packets;
sorting the data packets based on the respective serial numbers; and
displaying the sorted data packets.

15. The smart device of claim 14, wherein the processor is further configured to perform:
acquiring data streams transmitted from and to the first MCU of the smart device; and
packetizing the data streams into the data packets.

16. The smart device of claim 14, wherein the processor is further configured to perform:
sending the data packets added with the respective serial numbers to the terminal in a wireless communication manner, or based on a User Datagram Protocol (UDP) or an Internet Protocol (IP).

* * * * *